March 5, 1957 R. A. BRAUNBERGER 2,784,009
COMPRESSION TYPE SHOCK ABSORBING BEARINGS FOR FIFTH
WHEEL TILTING PLATES AND THE LIKE
Filed Aug. 2, 1954 2 Sheets-Sheet 1

INVENTOR.
RAY A. BRAUNBERGER
BY
Attorney

March 5, 1957  R. A. BRAUNBERGER  2,784,009
COMPRESSION TYPE SHOCK ABSORBING BEARINGS FOR FIFTH
WHEEL TILTING PLATES AND THE LIKE
Filed Aug. 2, 1954  2 Sheets-Sheet 2

INVENTOR.
RAY A. BRAUNBERGER
BY
Bruno C Lechler
Attorney

United States Patent Office 2,784,009
Patented Mar. 5, 1957

2,784,009

COMPRESSION TYPE SHOCK ABSORBING BEARINGS FOR FIFTH WHEEL TILTING PLATES AND THE LIKE

Ray A. Braunberger, Chicago, Ill.

Application August 2, 1954, Serial No. 447,326

12 Claims. (Cl. 280—440)

The invention relates to an improved bearing for tilting plates such as the top plate of a fifth wheel such as is mounted on a tractor chassis and which supports the forward end of a semi-trailer.

The invention is applicable to any pivoted plate bearing that transmits heavy loads that may vary in direction from a vertical to an inclined direction and is not limited to use in fifth wheels although the invention will be illustrated by its application to a fifth wheel.

Such fifth wheels transmit the entire weight of the forward end of the semi-trailer to the ground through the tractor. The entire tractive force is also transmitted from the tractor to the semi-trailer through the fifth wheel.

To allow for changes in grade in the road over which the semi-trailer and the tractor pass, the fifth wheel plate on which the forward end of the semi-trailer rests must be able to tilt or rock relative to the tractor chassis. Thus the bearing between the fifth wheel plate and the pair of supports carried by the tractor chassis must transmit large loads, large tractive forces, and also allow a tilting motion.

Due to strains in the structure the axis of the two pieces that tilt relative to each other may no longer coincide.

In addition to these large forces the irregularities of the road such as holes, stones, high spots, and tilt of the road produce large, sudden forces or jolts of various types.

It has been realized that the weight of the fifth wheel, which should be kept at a minimum since it is always hauled around and is not a pay load, could be reduced if as many parts as possible were cast integrally and if the fifth wheel were provided with some resilient member through which the load is transmitted to absorb these jolts.

The fifth wheel plate must be anchored to the supporting brackets carried by the tractor in some manner to prevent a jolt, or a tilt of the semi-trailer lifting the fifth wheel plate off its support. Such anchoring means that still allow a tilting motion frequently wear allowing undesired rattle. The invention provides a compressed resilient element that prevents such rattle.

The object of the invention is to provide a fifth wheel support having a resilient member centered about the axis of tilt of the fifth wheel plate transmitting pressure over a wide range of directions.

A further object of the invention is to provide a fifth wheel support having a convex cylindrical surface, a fifth wheel plate having a concave cylindrical surface, and a layer of resilient material located between them and shaped to these cylindrical surfaces.

A further object of the invention is to provide a curved plate to which a rubber layer has been vulcanized that may be inserted between the convex cylindrical surface of the support and the concave surface of the fifth wheel and which may be so anchored that the tilting motion takes place between two metal surfaces and not between rubber and metal.

A further object is to provide a fifth wheel plate support that includes curved surfaces on the plate and its support, a compressible member between these surfaces, an annular member applied after the compressible member is compressed which holds the fifth wheel plate and its support in contact during jolts.

A further object is to permit slight axial misalignment of a pivotal support carrying heavy loads.

Figure 1:
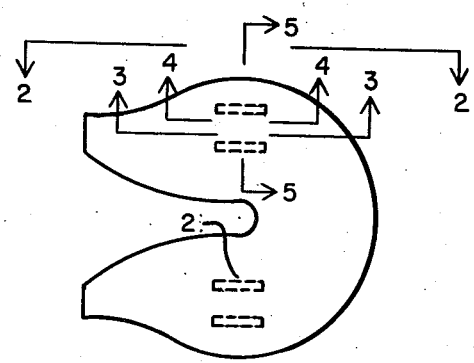
Figure 1 shows, in plan, a plate tiltably supported, such as a fifth wheel plate that is used to support the front end of a semi-trailer.
Figure 5:
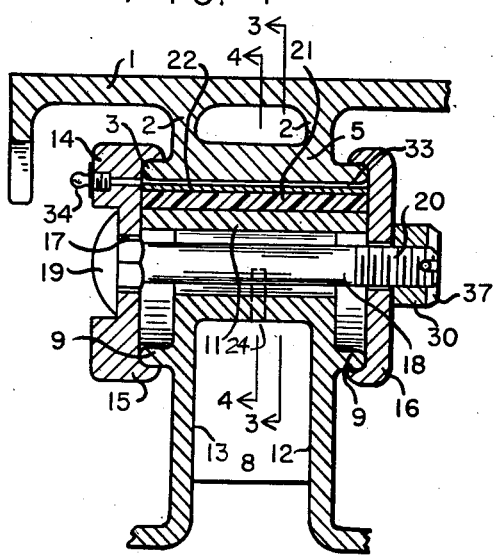
Figure 6:
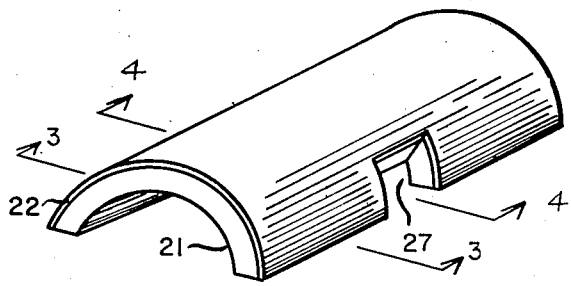
Figure 2:
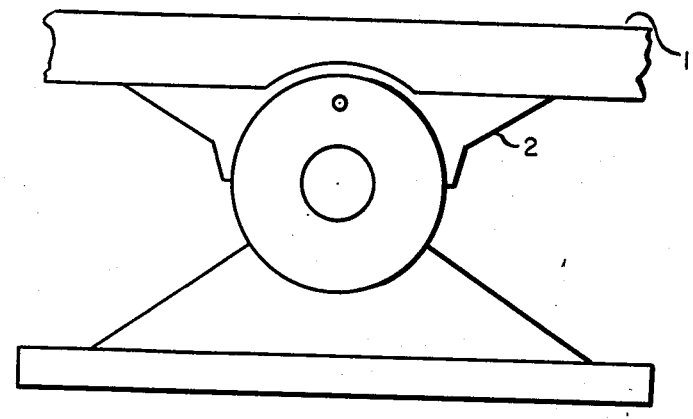
Figure 2 is an end elevation of part of said plate and its support as applied to a fifth wheel, taken along lines 2—2 in Figure 1, when the top plate is in a level position.
Figure 3:
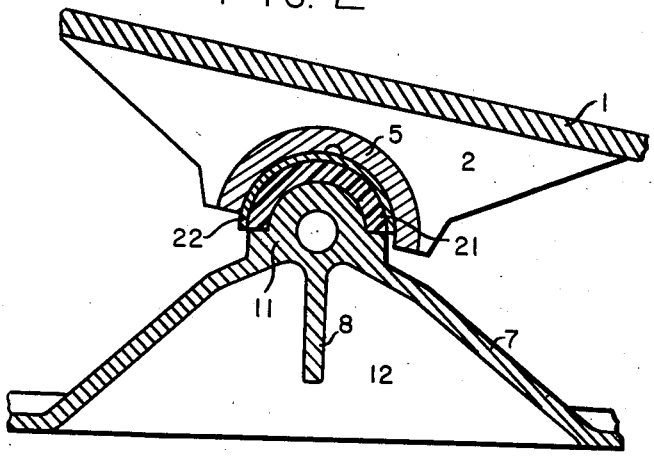
Figure 3 shows a portion of said fifth wheel plate and its support in vertical section taken along lines 3—3 in Figures 1, 5, and 6 when the plate is tilted.
Figure 4:
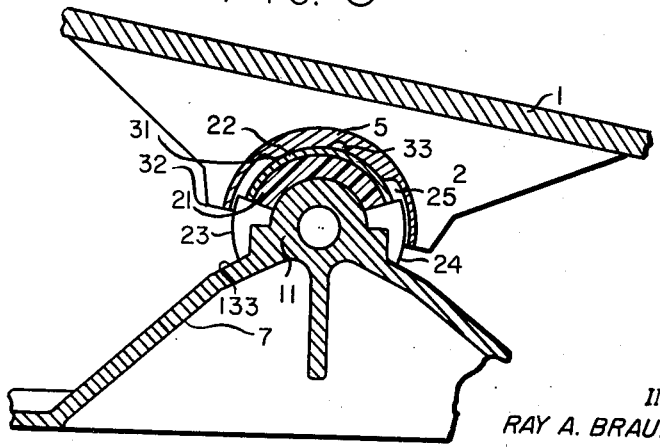

Figure 4, like Figure 3, shows a portion of the fifth wheel plate and its support when the top plate is tilted and is taken in a vertical section parallel to section 3 as shown in Figure 1, line 4—4, and in Figures 5 and 6.

Figure 5 is a vertical section of a portion of the fifth wheel plate and its support taken at right angles to Figures 3 and 4 along lines 5—5 in Figure 1.

Figure 6 shows in perspective, a rubber sheet bonded to a curved metal plate.

Figures 2, 3, 4 and 5 are drawn to a larger scale than Figure 1 and Figure 6 is drawn to a still larger scale.

In these drawings, 1 indicates a pivotally supported plate, such as the top plate of a fifth wheel, having supporting lugs 2 that may be integrally cast on the underside of the plate. These lugs are integral with a concave cylindrical portion 5 of the plate so that the load on top plate 1 is transmitted to the cylindrical portion 5.

The cylindrical portion 5 of the plate or casting has extensions 3 extending beyond the lugs 2. The load is transferred to a plate 22 to which a layer 21 of resilient material is attached forming the unit shown in perspective in Figure 6. The resilient material may be above or below the plate, but is here shown as below the plate.

The load is transferred from this unit to a base 7 having vertical ribs 8 and 12, and 13 that are cast integral with a cylinder 11 that also has extensions 9 extending beyond the vertical walls 12 and 13 of the base.

The unit shown in Figure 6 is anchored relative to either portion 5 or cylinder 11 so that, as the fifth wheel tilts, the movement is between plate 22 and a metal surface, not between a metal surface and the resilient material 21. As here illustrated, the resilient material is a rubber sheet, the plate 22 is steel plate to which the rubber is vulcanized, and the resilient material is shown attached to the lower side of the plate and the plate is anchored to the convex cylinder 11 of the base 7.

The cap 14 has flanges 15 and a rectangular hole 17 that prevents the carriage bolt 18 turning.

Flange 15 is concentric with the axis of the hole 17 and is at such a distance therefrom that when the cap 14 is assembled with the cap in the position shown in Figure 5 and a load on plate 1 to compress the rubber 21 this flange will conform to the outer surface of projections 3 and 9.

This cap 14, when in the position shown, tends to hold plate 1 and base 7 in such relative position that a jolt cannot lift the plate off the supports.

Cap 16 is like cap 14 only that the central hole may be circular. A carriage bolt 18 having a head 19 and a thread 20 permits the bolt to be drawn up by nut 30 holding both the caps against the extensions 3 and 9.

As shown in Figures 3, 4, 5 the load is transmitted from plate 1 to cylindrical section 5 and thence to the plate 22, rubber sheet 21, to the cylindrical surface 11.

This construction has the advantage that jolts are absorbed; slight misalignments whether caused by load distortion or otherwise can be absorbed by the rubber.

The purpose in supporting the plate on the supports in the manner shown is to allow the plate to tilt about the axis of bolt 18 by sliding portion 5 over plate 22. Relative axial motion between the parts 5 and 11 should be avoided.

To prevent axial motion, the base carries one or more segments of arcs 23, 24 that extend above the center of the bolt and are cast integral to the cylinder 11.

The cylindrical portion 5 of the plate 1 has grooves 25 shown in Figure 4 into which these arc segments 23, 24 extend.

The grooves 25 have an end 31 against which the end arc 23 or 24 may bear when the fifth wheel plate 1 has tilted a predetermined amount. The end 32 of cylindrical section 5 may also bear on surface 133 of base 7 when the fifth wheel plate has tilted the predetermined angle.

The rubber sheet 21 and the curved plate 22 are cut away as shown at 27 to allow the arcs 23, 24 attached to the cylindrical surface 11 to enter the grooves 25.

Thus any lateral force that might tend to slide the fifth wheel plate in the direction of bolt 18 is transmitted through the fifth wheel 1, cylindrical portion 5, groove 25, arcs 23, 24 to the cylindrical surface 11 forming part of base 1.

The notch 27, engaging the sides of the arc 23 or 24 also prevents the unit shown in Figure 6 moving axially.

33 is an oil groove and 34 is an oil fitting to feed oil to the groove.

When the invention is applied to a fifth wheel two supporting castings 7 are attached to the chassis of a tractor.

Units shown in Figure 6 are placed on the convex cylindrical portion 11 of each supporting casting so that slot 27 in plate 22 is entered by arc 23 or 24.

The fifth wheel plate is now placed on these units so that the cylindrical surface 5 rests on the unit and arcs 23, 24 enter grooves in the cylindrical portion 5.

After the weight is applied to compress the rubber, the caps 14, 16 are now placed so that flanges 15 fit over extension 3 of the fifth wheel plate and extension 9 of the support 7.

Bolt 18 is now passed through the central holes in caps 14 and 16 and there are drawn up to prevent the fifth wheel lifting off its base.

I claim:

1. A load-carrying plate, a base supporting said plate in a manner to permit it to tilt about an axis, a convex cylindrical surface on that portion of either said plate or base transmitting pressure, a concave cylindrical surface on that portion of the other receiving pressure, a curved metal plate between said surfaces, a layer of resilient material between said metal plate and one of said surfaces, means preventing angular movement of said metal plate relative to that surface against which said resilient material rests when the load-carrying plate is tilted.

2. A load-carrying plate, a base supporting said plate in a manner to permit it to tilt about an axis, a convex cylindrical surface on that portion of either said plate or base transmitting pressure, a concave cylindrical surface on that portion of the other receiving pressure, a curved metal plate between said surfaces, a layer of resilient material between said metal plate and one of said surfaces, means preventing angular movement of said metal plate relative to that surface against which said resilient material rests when the load-carrying plate is tilted, longitudinal flanges on both said load-carrying plate and said base concentric with the axis of each curved surface, an annular element encircling the longitudinal flanges concentric with said respective surfaces to prevent the load-carrying plate and the base from becoming separated.

3. A load-carrying plate, a base supporting said plate in a manner to permit it to tilt about an axis, a convex cylindrical surface on either said plate or base, a concave cylindrical surface on the other, a radial flange on one of said surfaces, a radial groove on the other of said surfaces into which said flange enters to prevent axial movement of the parts, a curved metal plate between said surfaces, a layer of resilient material between said metal plate and one of said surfaces, means preventing angular movement of said metal plate relative to that surface against which said resilient material rests when the load-carrying plate is tilted.

4. A load-carrying plate, a base supporting said plate in a manner to permit it to tilt about an axis, a convex cylindrical surface on either said plate or base, a radial flange on one of said surfaces, a radial groove on the other of said surfaces into which said flange enters to prevent axial movement of the parts, a concave cylindrical surface on the other, a curved metal plate between said surfaces, a layer of resilient material between said metal plate and one of said surfaces, means preventing angular movement of said metal plate relative to that surface against which said resilient material rests when the load-carrying plate is tilted.

5. A load-carrying plate, a base supporting said plate in a manner to permit it to tilt about an axis, a convex cylindrical surface on that portion of either said plate or base transmitting pressure, a concave cylindrical surface on that portion of the other receiving pressure, a curved metal plate between said surfaces, a layer of resilient material between said metal plate and one of said surfaces, two radial projections on one of said surfaces, two radial grooves on the other of said surfaces that are of such length as to limit the angle of tilt by the engagement of the ends of the projections with the ends of the grooves, means preventing angular movement of said metal plate relative to that surface against which said resilient material rests when the load-carrying plate is tilted.

6. A load-carrying plate, a base supporting said plate in a manner to permit it to tilt about an axis, a convex cylindrical surface on either said plate or base, a radial flange on one of said surfaces, a radial groove on the other of said surfaces into which said flange enters to prevent axial movement of the parts, a concave cylindrical surface on the other, a curved metal plate between said surfaces, a layer of resilient material between said metal plate and one of said surfaces, means preventing angular movement of said metal plate relative to that surface against which said resilient material rests when the load-carrying plate is tilted, and notches on the edges of said metal plate engaging said radial flanges to prevent relative axial movement of the parts.

7. A load-carrying plate, a base, a convex cylindrical surface on said base, longitudinal surfaces on said base extending alongside of said surface, a curved metal plate bearing on said longitudinal surfaces, a resilient layer attached to said metal plate and bearing on said convex cylindrical surface, a concave cylindrical surface on said load-carrying plate bearing on said curved metal plate and sliding thereon as the load-carrying plate is tilted on the base, a radial flange on said cylindrical surface, a radial groove on said concave surface, a flanged cap whose flanges engage said radial flange and said radial groove to prevent the fifth wheel plate being lifted from its support by jolts.

8. A load-carrying plate, a base, a convex cylindrical surface on said base, longitudinal surfaces on said base extending alongside of said surface, a curved metal plate bearing on said longitudinal surfaces, a resilient layer attached to said metal plate and bearing on said convex cylindrical surface, a concave cylindrical surface on said load-carrying plate bearing on said curved metal plate and sliding thereon as the load-carrying plate is tilted on the base, a radial flange on said cylindrical surface, a radial groove on said concave surface a flanged cap whose flanges engage said radial flange and said radial groove to prevent the fifth wheel plate being lifted from its support by jolts, notches in said curved plate to prevent longitudinal movement of the parts relative to each other.

9. A load-carrying plate, a base, a convex cylindrical surface on said base, longitudinal surfaces on said base extending alongside of said surface, a curved metal plate bearing on said longitudinal surfaces, a resilient layer attached to said metal plate and bearing on said convex cylindrical surface, a concave cylindrical surface on said load-carrying plate bearing on said curved metal plate and sliding thereon as the load-carrying plate is tilted on the base, axially extending flanges on said cylindrical surface and said convex surface, an annular element encasing both flanges to permit tilting but preventing the separation of the load-carrying plate and the base.

10. A fifth wheel for use in tractors adapted to move semi-trailers along highways having, in combination, fifth wheel supports adapted to be attached to the chassis of a tractor, a fifth wheel plate adapted to support the forward end of a semi-trailer, convex cylindrical surfaces on said supports, concave cylindrical surfaces on said fifth wheel plate, a curved plate and a curved layer of resilient material between said cylindrical surfaces through which the loads on said fifth wheel plates are transmitted to said supports, radial ribs extending outward from the convex cylindrical surface and engaging opposite ends of said plate to cause the cylindrical surfaces on the opposite sides of the resilient material to tilt together.

11. A fifth wheel for use in tractors adapted to move semi-trailers along highways having, in combination, fifth wheel supports adapted to be attached to the chassis of a tractor, a fifth wheel plate adapted to support the forward end of a semi-trailer, cylindrical surfaces on said supports and fifth wheel plate, a curved plate, a curved layer of resilient material between said cylindrical surfaces through which the loads on said fifth wheel plates are transmitted to said supports, a radial arc projecting from the cylindrical surface adjacent to said resilient material, a slot in the edge of said curved plate entered by said radial arc to cause said plate and said cylindrical surface to move together.

12. A fifth wheel for use in tractors adapted to move semi-trailers along highways having, in combination, fifth wheel supports adapted to be attached to the chassis of a tractor, a fifth wheel plate adapted to support the forward end of a semi-trailer, cylindrical surfaces on said supports and fifth wheel plate, a curved plate, a curved layer of resilient material between said cylindrical surfaces through which the loads on said fifth wheel plates are transmitted to said supports, a radial arc projecting from the cylindrical surface adjacent to said resilient material, a slot in the edge of said curved plate entered by said radial arc to cause said plate and said cylindrical surface to move together and grooves in said other cylindrical surfaces in which said radial arc moves as the fifth wheel plate is tilted.

References Cited in the file of this patent
UNITED STATES PATENTS

| | | |
|---|---|---|
| 1,508,049 | Lord | Aug. 4, 1925 |
| 2,263,114 | Winn | Nov. 18, 1941 |
| 2,468,013 | Kayler | Apr. 19, 1949 |
| 2,507,616 | Stephen | May 16, 1950 |